United States Patent [19]

Sakakiyama

[11] Patent Number: 4,558,414
[45] Date of Patent: Dec. 10, 1985

[54] SYSTEM FOR CONTROLLING A POWER TRANSMISSION OF A FOUR-WHEEL DRIVE VEHICLE

[75] Inventor: Ryuzo Sakakiyama, Tokyo, Japan

[73] Assignee: Fuji Jukogyo Kabushiki Kaisha, Tokyo, Japan

[21] Appl. No.: 484,330

[22] Filed: Apr. 12, 1983

[30] Foreign Application Priority Data

Apr. 14, 1982 [JP] Japan ................................. 57-63009

[51] Int. Cl.[4] ........................ B60K 17/34; B60K 23/08
[52] U.S. Cl. ................................. 364/424.1; 180/197; 180/233
[58] Field of Search ...................... 364/424.1; 180/233, 180/247, 197

[56] References Cited

U.S. PATENT DOCUMENTS 4,433,748 2/1984 Satoh et al. .......................... 180/247
4,466,502 8/1984 Sakai .................................... 180/247
4,484,653 11/1984 Hirokoshi et al. ................... 180/233

FOREIGN PATENT DOCUMENTS 58-56922 4/1983 Japan .................................... 180/233

Primary Examiner—Felix D. Gruber
Attorney, Agent, or Firm—Martin A. Farber

[57] ABSTRACT

A system for a four-wheel drive vehicle for automatically changing a power transmission system of the engine of the vehicle from two-wheel driving to four-wheel driving in accordance with driving conditions. The transmission system transmits power from the engine to main wheels, and a clutch is provided for transmitting the power of the engine to auxiliary wheels. A speed sensor is provided for producing output signals dependent on speed of the main wheels. A first computing circuit is provided for producing a vehicle speed signal from the output signals of the speed sensor, and a second computing circuit is provided for producing an angular acceleration signal from the output signals of the speed sensor. A comparing circuit is provided for comparing the angular acceleration signal and a reference value with each other and for producing an output signal when the angular acceleration signal is higher than the reference value. The reference value is decreased as the vehicle speed increases. The output signal of the comparing circuit is applied to a switch to engage the clutch, whereby the four-wheel driving power transmission is established.

7 Claims, 5 Drawing Figures

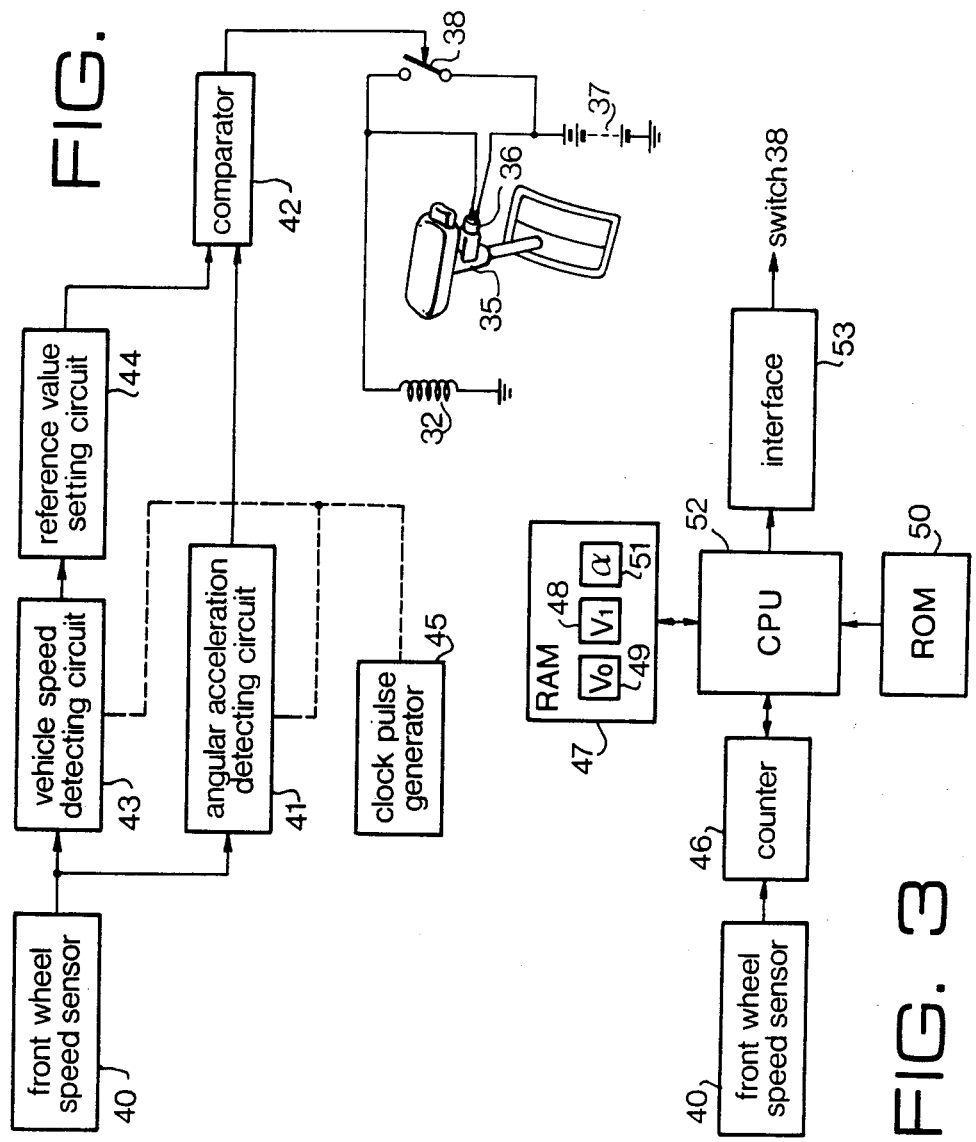

SYSTEM FOR CONTROLLING A POWER TRANSMISSION OF A FOUR-WHEEL DRIVE VEHICLE

BACKGROUND OF THE INVENTION

The present invention relates to a system for a four-wheel drive vehicle for automatically changing the transmission system of the vehicle from two-wheel drive to four-wheel drive when at least one of the wheels of the vehicle slips.

In a conventional four-wheel drive vehicle, a power transmission system for the two-wheel drive is selectively converted to the four-wheel drive by engaging a clutch which is manually operated by a select lever.

When the vehicle travels on slippery, icy or snowy road by two-wheel drive, the transmission system should be changed to the four-wheel drive in order to prevent wheels from slipping. If the changing operation is done after the slipping of wheels because of the driver's misjudgement of the slipping, the slipping cannot be stopped or reduced. Therefore, it is necessary to change the transmission system to the four-wheel drive at the first stage of the slipping.

To meet such a requirement, an automatic control system for the four-wheel drive has been proposed in Japanese Patent Application No. 56-155857 (laid-open publication No. 58-56924 laid open on Apr. 4, 1983) which was filed by the assignee of this application; the publication date is prior to the application date but after the priority date of the present invention and this may not be prior art and is not admitted as prior art. Slipping of wheels can be detected by sensing excessive angular acceleration of drive wheels. Accordingly, the system is provided with a slip detecting circuit which produces a clutch signal when the angular acceleration of the drive wheels exceeds a predetermined reference value. The clutch signal causes a clutch to engage, so that the two-wheel drive is automatically changed to the four-wheel drive.

It will be noted that rapid starting and rapid acceleration also lead to angular acceleration. In order to distinguish this from the angular acceleration during slipping of wheels, the reference value is set at a value higher than the highest value caused by the rapid acceleration at the largest torque which occurs under non-slipping conditions.

In this connection, it should be noted that the driving force decreases as vehicle speed increases. FIG. 5 shows the relationship between the vehicle speed and the driving force, in which a is a driving force curve at the first speed of a transmission, b, c and d are driving force curves at the second, third and fourth speeds, respectively, and e(V) which is a function of vehicle speed driving force curve. It will be understood that angular acceleration at slipping decreases as the tangential driving force curve e decreases, namely as the vehicle speed increases. Therefore, if the reference value for detecting the slipping is set at a high value, slipping at a high speed driving cannot be detected. Thus, the reference value should be changed according to the change of the vehicle speed.

SUMMARY OF THE INVENTION

Therefore, it is an object of the present invention to provide a system in which the reference value for detecting the wheel slipping is varied according to the variation of the vehicle speed, whereby slipping can be reliably detected as the initial stage of slipping.

According to the present, there is provided a system for controlling a power transmission of a four-wheel drive vehicle powered by an engine comprising: a transmission for transmitting the power of the engine to main wheels; a clutch for selectively transmitting the power to auxiliary wheels; sensing means for sensing speed of the main wheels for producing output signals in dependency on the speed; first computing circuit means for producing a vehicle speed signal from output signals of the sensing means; second computing circuit means for producing an angular acceleration signal dependent on the output signals of the sensing means; circuit means for producing a reference value dependent on the vehicle speed signal; the reference value decreases as vehicle speed increases; comparing circuit means for comparing the angular acceleration signal and the reference value with each other for producing an output signal when the angular acceleration signal is higher than the reference value; and switch means responsive to the output signal of the comparing circuit means for engaging the clutch, whereby the four-wheel driving power transmission is established.

The present invention will be more apparent from the following description made with reference to the accompanying drawings.

BRIEF DESCRIPTION OF DRAWINGS

FIG. 2 is a block diagram of a control circuit for the system of the present invention;

FIG. 3 is a block diagram showing another example of a control circuit;

DETAILED DESCRIPTION OF THE PREFERRED EMBODIMENTS

Figure 1:
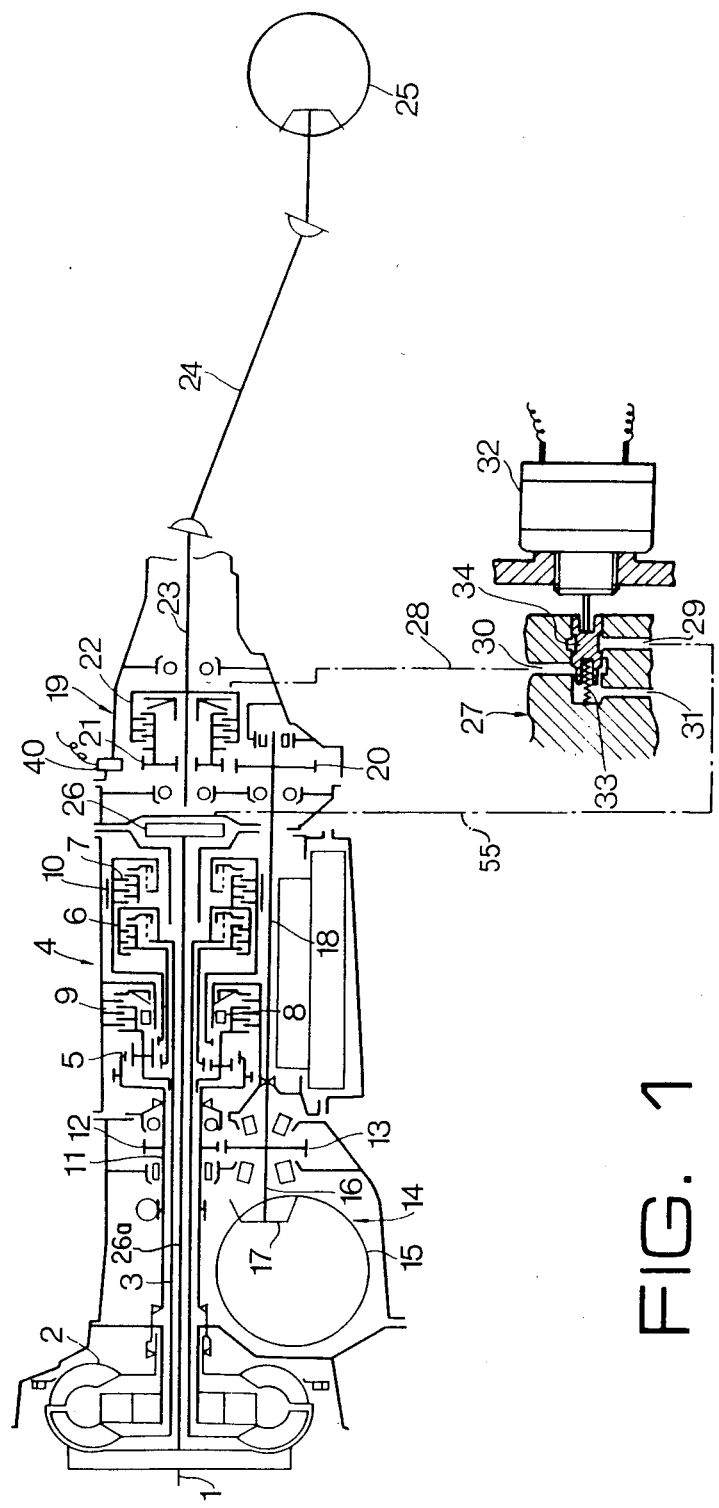
FIG. 1 is a schematic view showing a transmission system in which the present invention is applied.

Referring to FIG. 1, a crankshaft 1 of an engine (not shown) mounted on a vehicle is connected to a turbine shaft 3 through a torque converter 2. The turbine shaft 3 is operatively connected to an automatic transmission device 4.

The automatic transmisson device 4 comprises a planetary gear 5, clutches 6 and 7, a one-way clutch 8, a brake 9, and a brake band 10.

The output of the automatic transmission device is transmitted to an output shaft 11 on which a gear 12 is securely mounted and which in turn engages with a gear 13. The gear 13 is integral with a shaft 16 of a drive pinion 17 which engages with a crown gear 15 of a final reduction device 14 for front wheels of the vehicle. The shaft 16 is connected to a transfer drive shaft 18 which extends rearwardly and is connected to a first transfer gear 20 of a transfer device 19. The first transfer gear 20 is operatively connected to a hydraulic clutch 22 through a second transfer gear 21. The hydraulic clutch 22 is adapted to be engaged by pressure oil supplied by an oil pump 26. The driven member of the hydraulic clutch 22 is operatively connected to a final reduction device 25 for rear wheels through a rear drive shaft 23 and a propeller shaft 24.

Explaining a pressure oil control system, the control system has an electromagnetic changeover valve 27. The valve 27 comprises a spool 34 connected to a rod of a solenoid 32, a spring 33 to bias the spool to the right, an inlet port 29, an outlet port 30, and a drain port 31. The inlet port 29 is communicated with the oil pump 26 in the automatic transmission device 4 through a passage 55 and the outlet port 30 is communicated with the hydraulic clutch 22 by a passage 28 for the engagement thereof. The oil pump 26 is connected to a turbine of the torque converter 2 by an oil pump driving shaft 26a extending in the turbine shaft 3.

In the de-energized state of the solenoid 32, which is the illustrated state, the inlet port 29 is closed and the outlet port 30 is communicated with the drain port 31. Thus, the hydraulic clutch 22 is disengaged. When the solenoid 32 is energized, the spool 34 is shifted to the left against the spring 33, so that the drain port 31 is closed and the inlet port 29 is communicated with the outlet port 30 to engage the hydraulic clutch 22.

Referring to FIG. 2, a manual switch 36 is mounted on a select lever 35 of the automatic transmission device 4 and electrically connected between the solenoid 32 and a battery 37 in series. Further, an electrically operated switch 38 is connected to the manual switch 36 in parallel. Thus, the solenoid 32 is energized by closing the switch 36 or 38 to establish the four-wheel drive.

In order to sense the speed of the front wheels, a front-wheel speed sensor 40 is provided adjacent to the second transfer gear 21 (FIG. 1). The sensor 40 produces output pulses dependent on speed, which are applied to an angular acceleration detecting circuit 41 and to a vehicle speed detecting circuit 43. Each detecting circuit counts the number of the input pulses in the period between clock pulses which are applied from a clock pulse generator 45, so that a vehicle speed signal is generated from the vehicle speed detecting circuit 43, the angular acceleration detecting circuit 41 further subtracting the number of the input pulses between successive periods so that an angular acceleration signal is produced. The vehicle speed signal is applied to a reference value setting circuit 44. The reference value setting circuit 44 produces an output as a reference angular acceleration signal which decreases as the vehicle speed signal increases. As described above, the angular acceleration at slipping decreases as the tangential driving force curve e (FIG. 5) decreases. Accordingly, the reference angular acceleration signal for detecting the slipping varies with the vehicle speed as the curve e varies with the vehicle speed. The curve representing the reference angular acceleration signal $\alpha$ can be expressed by the formula $$\alpha = f(V) = \alpha(V)$$

Therefore, the reference value setting circuit 44 produces the reference angular acceleration signal $\alpha$ by computing the formula in accordance with the vehicle speed as determined by the vehicle speed signal, or by looking up a table map which is already made from the formula or the above graph. Both output signals of the circuits 41 and 44 are applied to a comparator 42 which produces an output when the angular acceleration signal is higher than the reference angular acceleration signal. The output of the comparator 42 causes the switch 38 to close to engage the hydraulic clutch 22.

Figure 4:
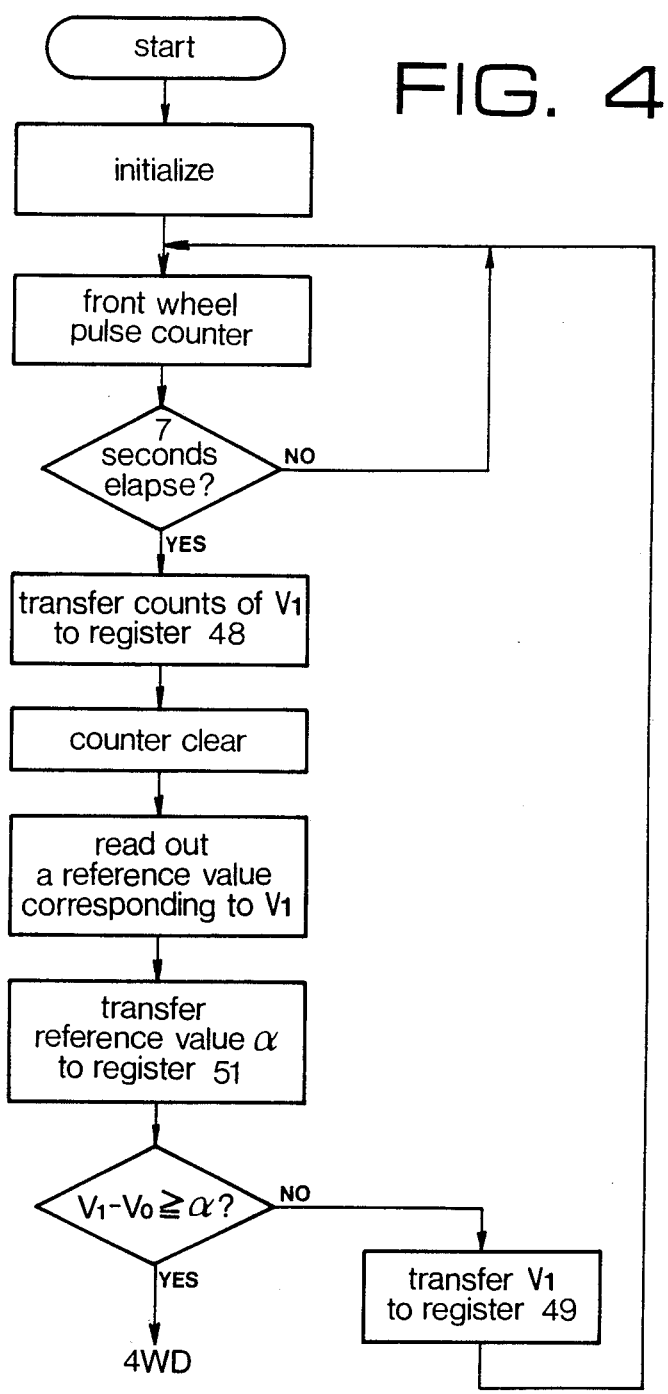
FIG. 4 shows a flow-chart.
Figure 5:
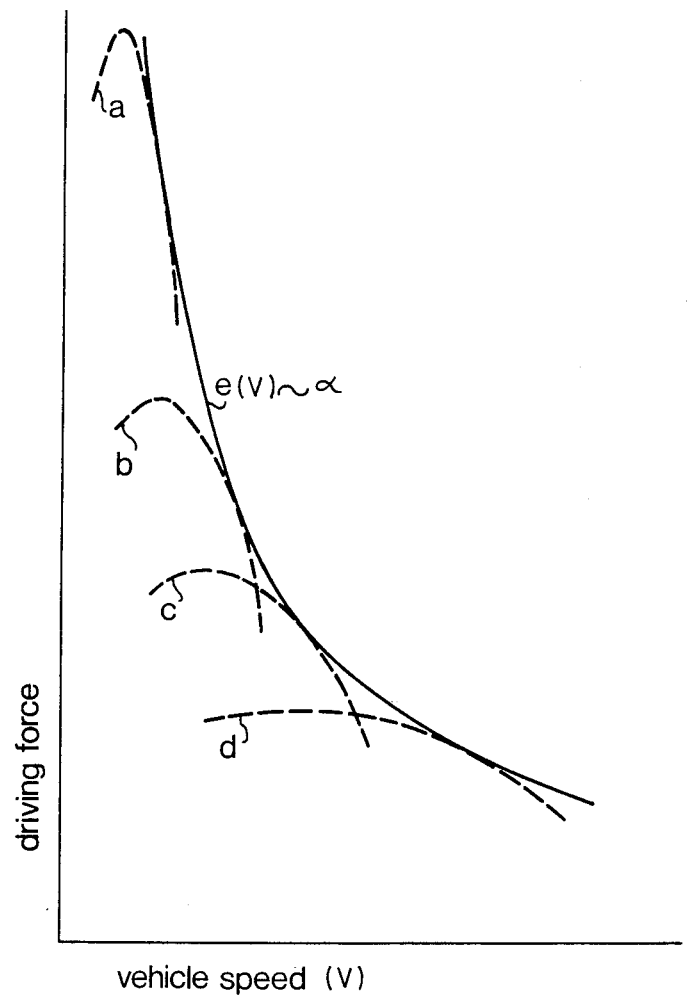
FIG. 5 shows the relationship between vehicle speed and driving force.

Referring to FIG. 3 showing another control circuit, output pulses of the front-wheel speed sensor 40 are applied to a counter 46 which counts the pulses for a period to produce a vehicle speed $V_1$. The vehicle speed $V_1$ is stored in a register 48 in a RAM 47 through a CPU 52. On the other hand, a vehicle speed $V_0$ which has been obtained a predetermined time before is stored in a register 49. In a ROM 50, the first dimension table map of reference angular acceleration signal values $\alpha$ corresponding to the relationship e(V) of FIG. 5 is stored (e($V_1$) meaning e is a functin of $V_1$, vehicle speed). A reference value $\alpha(V_1)$ corresponding to the vehicle speed $V_1$ is read out from the ROM 50 by the CPU 52 and is stored in a register 51. Thereafter, the CPU 52 operates to obtain angular acceleration by subtracting the vehicle speed $V_0$ from the vehicle speed $V_1$. Then the angular acceleration is compared with the reference value $\alpha$ and an output signal is produced from the CPU when the angular acceleration is higher than the reference value. The output signal is applied to the switch 38 through an interface 53 to close the switch. In the case that the angular acceleration is lower than the reference value, the vehicle speed $V_1$ is stored in the register 49 as speed $V_0$ for subsequent operation. Such an operation is repeated to control the power transmission system. FIG. 4 shows a flow-chart of the program.

Thus, in accordance with the present invention, the power transmission system is automatically changed from the two-wheel drive to the four-wheel drive according to the driving conditions. Since the reference value for detecting the occurrence of slipping increases with an increase of angular acceleration of the drive wheels, reliable detection can be obtained and slipping can be prevented by four-wheel driving.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. In a system for controlling a power transmission of a four-wheel drive vehicle powered by an engine, the vehicle having a transmission for transmitting the power of said engine to main wheels of the vehicle, a clutch for selectively simultaneously transmitting said power to auxiliary wheels of the vehicle, and sensing means for sensing speed of said main wheels for producing output signals in dependency on the speed, the improvement comprising:

first computing circuit means for computing vehicle speed from output signals of said sensing means and producing a vehicle speed signal;

second computing circuit means for computing angular acceleration from the output signals of said sensing means and for producing an actual angular acceleration signal;

means responsive to first computing circuit means for providing a reference angular acceleration signal which decreases as vehicle speed increases;

comparing circuit means for comparing the actual angular acceleration signal with said reference angular acceleration signal and for producing a slipping signal when the actual angular acceleration signal is higher than the reference angular acceleration signal; and switch means responsive to said slipping signal of said comparing circuit means for engaging said clutch, whereby four-wheel driving power transmission is established.

2. The system according to claim 1, wherein said clutch is a hydraulic clutch.

3. The system according to claim 1, wherein
said transmission includes a transfer gear driven by the transmission and having a speed proportional to that of the main wheels, and
said sensing means is a sensor provided adjacent to said transfer gear driven by the transmission so as to produce the output pulses of said sensing means dependent on the speed of the main wheels.

4. The system according to claim 3, wherein
said first computing circuit means comprises a counter counting the number of said output pulses of said sensing means for a predetermined period.

5. The system according to claim 3, wherein
said sensor and said transfer gear are located adjacent an upper portion of said transmission.

6. The system according to claim 5, wherein
said transmission includes another transfer gear and a transfer drive shaft operatively connected to said main wheels disposed at a lower portion of said transmission, said another transfer gear is rigidly connected to said transfer drive shaft,
said transfer gears mesh with each other.

7. The system according to claim 1, wherein
said reference angular acceleration signal corresponds substantially to a driving force curve as a function of vehicle speed which is tangential to actual driving force curves of all forward gear speeds of the vehicle.

* * * * *